(No Model.) 3 Sheets—Sheet 1.

G. REED.
PUMP.

No. 307,681. Patented Nov. 4, 1884.

WITNESSES:
Fred. G. Dieterich.
Wm. Fecher

INVENTOR.
Garnett Reed
Louis Bagger & Co.
ATTORNEYS.

(No Model.) 3 Sheets—Sheet 2.

G. REED.
PUMP.

No. 307,681. Patented Nov. 4, 1884.

WITNESSES:
Fred. G. Dieterich
Wm. Fecher

INVENTOR.
Garnett Reed
by Louis Bagger & Co.
ATTORNEYS.

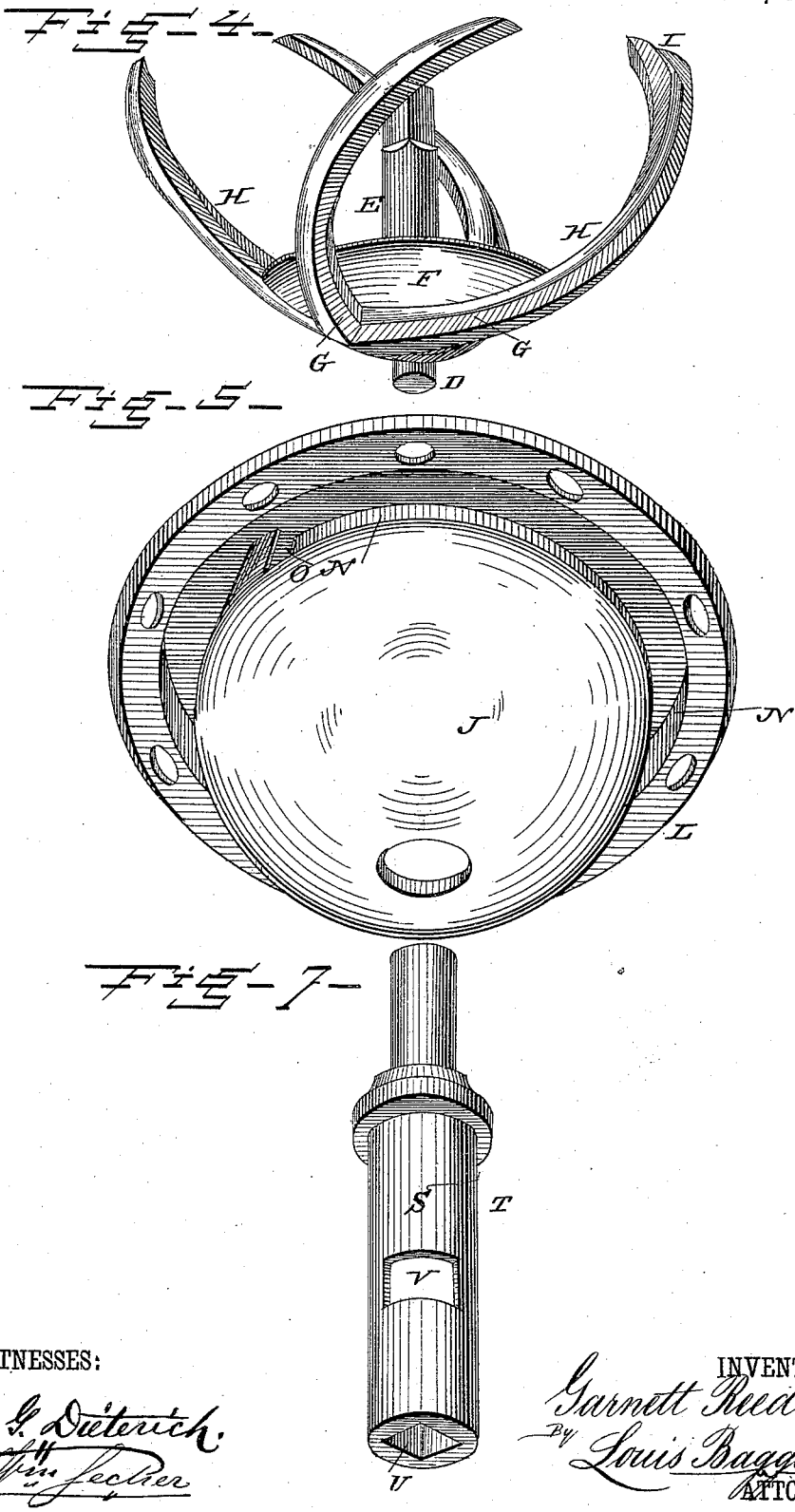

UNITED STATES PATENT OFFICE.

GARNETT REED, OF MOUNT STERLING, KENTUCKY, ASSIGNOR TO WILLIAM W. REED, OF SAME PLACE.

PUMP.

SPECIFICATION forming part of Letters Patent No. 307,681, dated November 4, 1884.

Application filed February 18, 1884. (No model.)

*To all whom it may concern:*

Be it known that I, GARNETT REED, of Mount Sterling, in the county of Montgomery and State of Kentucky, have invented certain new and useful Improvements in Centrifugal Pumps; and I do hereby declare that the following is a full, clear, and exact description of the invention, which will enable others skilled in the art to which it appertains to make and use the same, reference being had to the accompanying drawings, which form a part of this specification, and in which—

Figure 1:
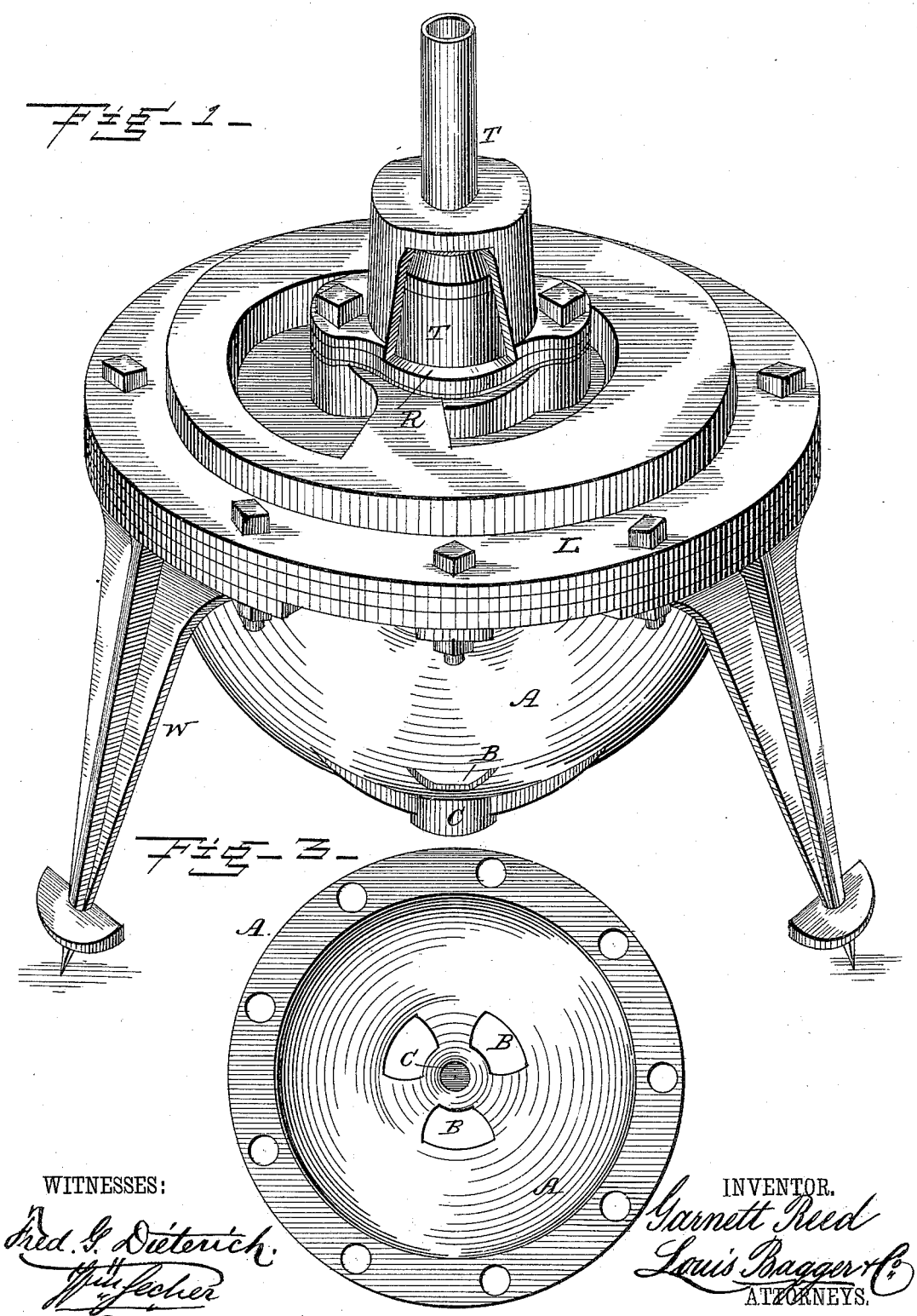
Figure 2:
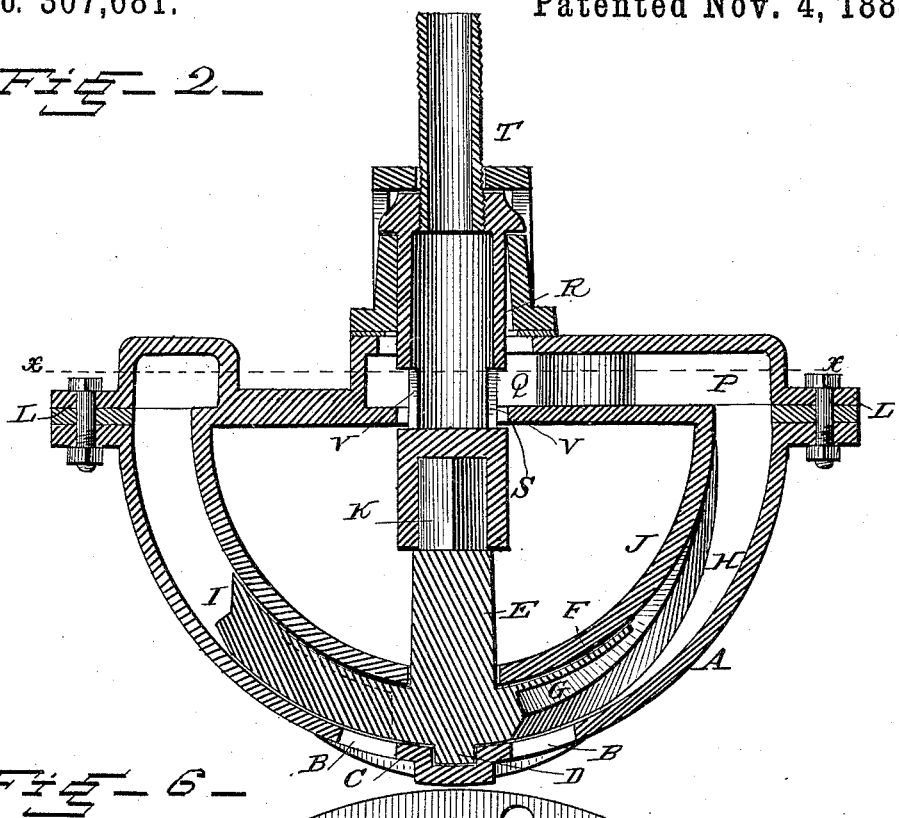
Figure 6:
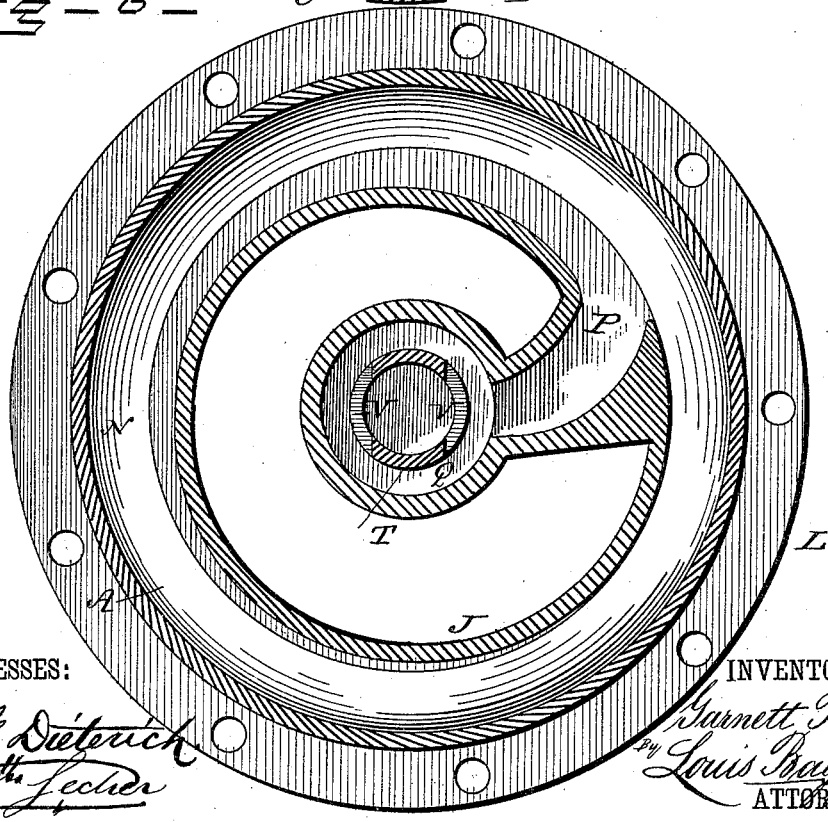

Figure 1 is a perspective view of my improved centrifugal pump. Fig. 2 is a vertical section of the same. Fig. 3 is a top view of the outer shell. Fig. 4 is a perspective view of the central short shaft with its curved pallets. Fig. 5 is a perspective view of the inner shell. Fig. 6 is a horizontal section on line *x x*, Fig. 2; and Fig. 7 is a perspective detail view of the lower end of the hollow drive-shaft or exit-pipe.

Similar letters of reference indicate corresponding parts in all the figures.

My invention has relation to centrifugal pumps; and it consists in the improved construction and combination of parts of the same, as hereinafter more fully described and claimed.

In the accompanying drawings, the letter A indicates a hemispherical or conical shell having one or more apertures, B, in its lower end, the hemisphere or cone being inverted and forming a bearing, C, upon the inner side of the lower end. The lower end, D, of a short shaft, E, fits and turns in this bearing, and is provided immediately above the bearing with a disk, F, of a shape corresponding to the shape of the outer shell—*i. e.*, of a spherical or conical shape—and extending far enough up upon the sides of the outer shell to cover the apertures in its bottom. The lower side of this disk has a number of raised ribs, G, having the side facing in the direction of the revolution of the shaft grooved, and these ribs are continued beyond the disk to the upper edge of the shell, forming the pallets H, having V-shaped grooves I in the edges facing in the direction of their revolution. These pallets are curved backward or away from the direction of their revolution, and fill the space between the inner side of the outer shell and the outer side of an inner shell, J, of a shape corresponding to the shape of the outer shell. The lower end of this inner shell forms a bearing for the upper end of the short shaft. the uppermost end of which shaft, K, is polygonous, or, rather, prismatic; and the top of the inner shell forms a flanged plate, L, the outer edge of which is secured to a flange, M, upon the upper edge of the outer shell by means of bolts or similar suitable means. The top plate and the portion of the inner shell which passes over into the top plate form an annular groove, N, the inner side, O, of which, which is formed by the upper portion of the inner shell, forms a portion of a spiral, which is continued by an inwardly-curved channel, P, formed in the top plate, which channel opens in the center of said plate, forming a chamber, Q, at that place, which chamber is provided with tight boxes or bearings R and S at its top and bottom, the form of which groove and channel is plainly shown in Figs. 2, 5, and 6. The lower enlarged end, S, of the hollow drive-shaft or exit-pipe T turns in these boxes, fitting with a polygonous socket, U, in its lower end upon the upper prismatic end of the short shaft, and has apertures V in its sides opening into the chamber between the boxes, allowing the liquid passing up through the spiral channel and into the chamber to pass up through the hollow shaft. The drive-power is applied to this hollow shaft in any desired manner, and the pump may be provided with legs or supports W, as shown in the drawings, or may be supported in any desired position by other suitable means, the apertures being immersed in the fluid to be raised.

It will be seen that as the hollow shaft is rotated the water will enter through the apertures in the bottom of the pump and be forced upward and outward by the curved and grooved rotating pallets, which will force the water through the aperture in the top of the casing into the spiral channel, from whence it will pass through the central channel into the hollow shaft, which carries it to its destination. It will also be seen that although the shells of the pump, and consequently also the pallets, may be made of a conical shape, it is more desirable to make them hemispherical, as the water in being forced upward along the upwardly-curved walls of the hemisphere will more readily enter the aperture in the annular groove than when being forced up along the conical sides of the shell, by reason of its receiving in the conical shell an impetus to fly outward more than to fly upward, while the curved walls of the hemisphere force it up in the groove and through the aperture in the same.

Having thus described my invention, I claim and desire to secure by Letters Patent of the United States—

1. In a centrifugal pump, the combination of a hemispherical outer casing having inlet-apertures in its lower end, a correspondingly-shaped inner shell having a receiving-groove and an outlet at its upper end, and a revolving disk shaped to conform to the shape of the shells, and having ribs upon its under side forming pallets curved away from the direction of their rotation, and having V-shaped grooves in their forward edges, as and for the purpose shown and set forth.

2. In a centrifugal pump, the combination of a hemispherical inverted outer shell having inlet-apertures at its lower end, and having a bearing at its lower end, a hemispherical inner shell having a flanged top secured to the top of the outer shell formed with an annular groove in the top and in the upper edge of the hemispherical shell provided with an outlet-aperture, and a revolving shaft turning with its lower end in the bearing in the lower end of the outer shell, and provided at its lower end with a concavo-convex disk having ribs upon its under side extending into pallets curved away from the direction of their revolution, and having V-shaped grooves in their forward edges, as and for the purpose shown and set forth.

3. In a centrifugal pump, the combination of a hemispherical outer shell having inlet-apertures in its lower end, and having a bearing at its lower end, having a laterally-projecting flange at its upper edge and placed in an inverted position in the fluid to be raised, an inner hemispherical shell having a bearing in its lower end, having a flanged flat top secured to the flanged outer shell and formed with an annular groove at its upper end having an aperture, and a spiral channel extending from the aperture in the groove into a central chamber in the top, a concavo-convex disk having a central upright shaft, and having ribs upon its under side extending upward formed into pallets curved away from the direction of their revolution, and having V-shaped grooves in their forward edges, and a hollow drive-shaft or revolving outlet-pipe fitting upon the upper end of the pallet-shaft and revolving with it, turning in boxes in the central chamber of the top of the shells, and having apertures in its sides forming connections with the central chamber, as and for the purpose shown and set forth.

4. In a centrifugal pump, the combination of a hemispherical outer shell having inlet-apertures in its lower end, a correspondingly-shaped inner shell having a top plate provided with a curved channel opening into the space between the shells and into a central chamber, a revolving shaft having pallets conforming to the shape of the space between the shells, and a revolving outlet-pipe or hollow drive-shaft fitting upon the end of the pallet-shaft, and having apertures in its sides opening into the central chamber receiving the outflowing fluid from the same, as and for the purpose shown and set forth.

In testimony that I claim the foregoing as my own I have hereunto affixed my signature in presence of two witnesses.

GARNETT REED.

Witnesses:
R. T. BEAN,
B. WYATT.